(12) United States Patent
Parker et al.

(10) Patent No.: US 10,704,932 B2
(45) Date of Patent: Jul. 7, 2020

(54) RANGE EXTENSION FOR OPTICAL FIBER SENSING SYSTEMS

(71) Applicants: Silixa Ltd., Elstree Hertfordshire (GB); Chevron U.S.A. Inc., San Ramon, CA (US)

(72) Inventors: Tom Parker, Elstree (GB); Mahmoud Farhadiroushan, Elstree (GB); Arran Gillies, Elstree (GB)

(73) Assignees: Silixa Ltd., Elstree Hertfordshire (GB); Chevron U.S.A. Inc., San Ramon, CA (US)

(*) Notice: Subject to any disclaimer, the term of this patent is extended or adjusted under 35 U.S.C. 154(b) by 271 days.

(21) Appl. No.: 15/532,812

(22) PCT Filed: Dec. 2, 2015

(86) PCT No.: PCT/GB2015/053681
§ 371 (c)(1),
(2) Date: Jun. 2, 2017

(87) PCT Pub. No.: WO2016/087850
PCT Pub. Date: Jun. 9, 2016

(65) Prior Publication Data
US 2017/0343389 A1 Nov. 30, 2017

(30) Foreign Application Priority Data
Dec. 3, 2014 (GB) .................... 1421470.4

(51) Int. Cl.
*G01D 5/353* (2006.01)
*G01H 9/00* (2006.01)
(Continued)

(52) U.S. Cl.
CPC .......... *G01D 5/35358* (2013.01); *G01D 5/353* (2013.01); *G01D 5/35338* (2013.01);
(Continued)

(58) Field of Classification Search
None
See application file for complete search history.

(56) References Cited

U.S. PATENT DOCUMENTS

| | | | |
|---|---|---|---|
| 6,449,046 B1 | 9/2002 | Huang et al. | |
| 2011/0242525 A1* | 10/2011 | Strong | G01M 11/083 356/73.1 |

(Continued)

FOREIGN PATENT DOCUMENTS

| | | | |
|---|---|---|---|
| CN | 103557877 A | * | 2/2014 |
| CN | 103557877 A | | 2/2014 |

(Continued)

OTHER PUBLICATIONS

Bolognini et al. ("Analysis of distributed temperature sensing based on Raman scattering using OTDR coding and discrete Raman amplification", Measurement Science and Technology, IOP Publishing, 2007, pp. 3211-3218) (Year: 2007).*

(Continued)

*Primary Examiner* — Michelle R Connelly
(74) *Attorney, Agent, or Firm* — Osha Liang LLP

(57) ABSTRACT

An optical fiber sensing system includes a sensing optical fiber and one or more optical amplifiers in series with the sensing fiber and arranged to increase the power of sensing pulses travelling along the fiber to thereby increase the range of the sensing system. The optical fiber sensing system is one selected from the group including an optical fiber distributed acoustic sensor (DAS), an optical fiber distributed temperature sensor (DTS), or an optical time domain reflectometry (OTDR) system.

17 Claims, 3 Drawing Sheets

(51) Int. Cl.
*G01M 11/00* (2006.01)
*G01K 11/32* (2006.01)
(52) U.S. Cl.
CPC ......... *G01D 5/35354* (2013.01); *G01H 9/004* (2013.01); *G01K 11/32* (2013.01); *G01M 11/3109* (2013.01)

(56) References Cited

U.S. PATENT DOCUMENTS

| | | | | |
|---|---|---|---|---|
| 2012/0127984 | A1* | 5/2012 | Feher | H04M 11/04 370/342 |
| 2012/0261050 | A1* | 10/2012 | Lindner | B32B 37/02 156/64 |
| 2013/0167628 | A1* | 7/2013 | Hull | G01V 1/001 73/152.58 |
| 2013/0292555 | A1* | 11/2013 | Akkaya | G01H 9/004 250/227.14 |
| 2015/0146759 | A1* | 5/2015 | Johnston | E21B 47/065 374/117 |
| 2015/0233236 | A1* | 8/2015 | Johnston | E21B 47/123 73/152.16 |
| 2019/0331523 | A1 | 10/2019 | Farhadiroushan et al. | |

FOREIGN PATENT DOCUMENTS

| | | |
|---|---|---|
| DE | 10 2013 004681 A1 | 9/2013 |
| JP | 2012068081 A * | 4/2012 |
| WO | 2010/136809 A2 | 12/2010 |
| WO | 2014/155400 A2 | 10/2014 |

OTHER PUBLICATIONS

International Search Report issued in corresponding application No. PCT/GB2015/053681 dated Mar. 23, 2016 (2 pages).
Written Opinion of the International Searching Authority issued in corresponding application No. PCT/GB2015/053681 dated Mar. 23, 2016 (5 pages).
British Search Report issued in corresponding application No. GB1421470.4 dated May 26, 2015 (3 pages).
Examination Report issued in corresponding application No. GB1708311.4 dated Dec. 23, 2019 (4 pages).
Rajan, Ginu et al. "Optical Fiber Sensors: Advanced Techniques and Applications" CRC Press, 2015, pp. 14-15 (3 pages).

* cited by examiner

RANGE EXTENSION FOR OPTICAL FIBER SENSING SYSTEMS

TECHNICAL FIELD

One or more embodiments of the present invention relate to optical fiber sensing systems, such as optical time domain reflectometers (OTDRs), as well as optical fiber distributed acoustic sensors (DASs), and optical fiber distributed temperature sensors (DTSs). Specifically, one or more embodiments of the present invention provide for range extension of such sensing systems by providing for optical signal repeater or amplifier modules to increase the power of any sensing pulses sent down the optical fiber.

BACKGROUND

Optical fiber based sensing systems are known already in the art. OTDRs are used to determine fiber condition and properties, such as splice or connector losses and attenuation, whereas DAS and DTS systems use backscatter and/or reflections from along the fiber to sense acoustic energy incident on the fiber, or ambient temperature around the fiber, as appropriate. An example prior art DAS system is the Silixa® iDAS™ system, available from Silixa Ltd, of Elstree, UK, the details of operation of which are described in our earlier patent application WO2010/0136809, any details of which that are necessary for understanding the present invention being incorporated herein by reference. An example DTS system is the Silixa® Ultima™ system.

At a high level, DAS and DTS systems operate by sending sensing pulses down an optical fiber deployed in the environment which is to be monitored. For a DAS system the vibrations of an incident acoustic wave on the fiber cause modulations in the backscatter or reflections from the fiber as the pulse travels along the fiber. By measuring the backscatter and/or reflections and detecting such modulation then the incident acoustic wave can be determined. For a DTS system, ambient temperature affects the amount of backscatter and/or reflections from different parts of the fiber at different ambient temperatures, so that again temperature along the fiber can be inferred by monitoring the backscatter and/or reflections.

At present most optical fiber DAS and DTS systems are limited in range to around 5 km or so, due to attenuation in the fiber of both of the outward sensing pulse, and the resulting backscatter and/or reflections along the fiber. Specifically, as a sensing pulse travels along the fiber it will spread in time, and decrease in amplitude (and power), such that backscatter and/or reflections from along the fiber from the pulse will consequentially also be temporally spread and be of lower amplitude. Given that the backscatter and/or reflections will need to travel back along the fiber to the DAS sensor, and hence be further dispersed by the fiber, there is a limit to the range of fiber along which a pulse can be sent and resulting backscatter and/or reflections determined before the backscatter and/or reflections hit the sensor noise floor. In a typical DAS or DTS scenario, a range of around 5 km would be typical i.e. the DAS or DTS would be able to resolve a signal along approximately 5 km of sensing fiber.

For many DAS or DTS sensing applications, a 5 km range is more than adequate. However, for some applications, and particularly security applications such as pipeline security or area security, a greater range would be useful. Whilst range can of course be increased by the provision of several independent systems (i.e. it would be possible to position a DAS box every 5 km along a pipeline), such increases the system deployment cost, and leads to other problems in synchronisation of monitoring of several independent sensor systems of the same type. It would therefore be highly beneficial if the range of optical fiber sensing systems, such as DAS and DTS, but including other OTDR systems, could be increased.

SUMMARY

One or more embodiments of the present invention apply techniques known already from the telecommunications industry, and in particular the provision of repeater amplifiers such as erbium doped fiber amplifiers (EDFAs), to provide for an optical fiber sensor of increased range. In particular, in an optical fiber sensing system of one or more embodiments of the present invention one or more optical amplifiers, such as optical fiber amplifiers like EDFAs, are provided in series with the sensing fiber in order to increase the power of any sensing pulses being sent in a forward direction along the fiber. Optical circulators are provided either side of the optical amplifier, to allow backscattered and/or reflected light to be routed around the forward path optical amplifier. In some embodiments an optical amplifier may also be provided in the backscatter and/or reflections feedback path, to increase the power of the backscatter. In further embodiments signal conditioning circuitry may be used, such that the forward optical pulse signal is filtered and/or reconstructed so as to be more like the original pulse (i.e. typically with less time spreading) when output by the amplifier. In some embodiments this may be done within the optical domain by the provision of appropriate bandpass filters, or in other embodiments electronically, with an incoming pulse being electronically sampled and then fed to a controller, which then electronically controls an optical amplifier to reproduce a re-generated (with respect to amplitude, wavelength and time) pulse for onward transmission along the next length of fiber. Up to two, three, four, or more lengths of fiber may be connected together in series with such optical amplifiers, in order to double, triple, quadruple, or even further increase the range of an optical fiber sensing system.

In view of the above, from one aspect there is provided an optical fiber sensing system, comprising a sensing optical fiber and one or more optical amplifiers in series with the sensing fiber and arranged to increase the power of sensing pulses travelling along the fiber to thereby increase the range of the sensing system.

One or more embodiments of the invention comprise optical amplifier bypass optical componentry arranged to permit optical backscatter and/or reflections from along the sensing fiber to bypass the one or more optical amplifiers.

In some embodiments the bypass optical componentry includes one or more optical amplifiers arranged to amplify the optical backscatter so as to maintain the backscatter and/or reflections above the noise floor. This allows the range of the sensor to be increased.

In some embodiments the bypass optical componentry has backscatter and/or reflections conditioning componentry arranged to maintain or improve the spectral form of the backscatter and/or reflections. Again, such measures helps to improve the range of the sensor. The backscatter and/or reflections conditioning componentry may include one or more bandpass filters.

In some embodiments pulse conditioning componentry is further provided, arranged to condition sensing pulses travelling along the fiber. Preferably the pulse conditioning componentry includes a bandpass filter to help to maintain the spectral form of the pulses.

In some embodiments the pulse conditioning componentry includes signal regeneration componentry arranged to receive an incoming optical pulse and actively re-generate it with an intended optical pulse signal envelope. In this way, the sensing pulses are reproduced at various points along the sensing fiber, and hence sensing fidelity can be maintained over greater range.

In the above embodiments the signal regeneration componentry may include an electro-optic sampler to sample an incoming optical pulse and convert it into the electrical domain, and a signal processor arranged to receive the electrical analogue of the incoming optical pulse from the sampler and re-generate the optical pulse signal envelope, the signal processor being further arranged to control the optical amplifier to reproduce the regenerated optical pulse in accordance with the regenerated optical pulse signal envelope for onward transmission along the optical fiber.

Moreover, in some embodiments the optical amplifier reproduces the regenerated optical pulse at a different wavelength to the sampled incoming optical pulse. This can allow for improved signal discrimination, as backscatter and/or reflections from different lengths of fiber between the optical amplifiers along the whole length will be of different wavelengths.

In preferred embodiments the optical amplifiers are optical fiber amplifiers, and more preferably erbium doped fiber amplifiers. In some embodiments the optical amplifiers are fed via optical fiber from a laser pump located remotely therefrom. Such arrangements are particularly advantageous for downhole sensing applications.

The sensing system may be any optical fiber sensing system. In some embodiments the sensing system is an optical fiber distributed acoustic sensor (DAS), whereas in other embodiments the sensing system is an optical fiber distributed temperature sensor (DTS). In addition, in further embodiments the sensing system is an optical time domain reflectometry (OTDR) system.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

One or more embodiments of the present invention provide for range extension for optical fiber based sensing systems, by borrowing technology from the telecommunications industry, and redeploying it in the sensing technology space. In particular, one or more embodiments of the invention make use of optical amplifiers, such as optical fiber amplifiers like erbium doped fiber amplifiers (EDFAs), to amplify the forward optical pulses travelling from a pulse source apparatus in a distributed acoustic sensor, distributed temperature sensor, or OTR apparatus, so that the power of the pulse or pulses is maintained along a greater length of fiber than would otherwise be the case. In addition, some embodiments provide for signal conditioning circuitry such as filters, samplers, or the like to allow the pulse to be reconditioned to allow it to travel along the next length of fiber, whereas some embodiments regenerate the pulses at different points along the fiber. Irrespective of the amplification, conditioning, or regeneration that is applied to the forward pulses, backscatter and/or reflections from the forward pulses from along the fiber is fed back along the fiber, and routed around the forward optical amplifiers by optical circulators. If necessary, return path amplification can be provided, again by optical fiber amplifiers such as erbium doped fiber amplifiers. In addition, backscatter and/or reflections signal conditioning with, for example, band pass filters and the like can also be provided in the return path.

With one or more embodiments of the present invention the range of optical fiber sensors such as distributed acoustic sensors, distributed temperature sensors, or OTDR sensors can be extended by two, three, four or more times. Thus, for example, it may be possible to produce a distributed acoustic sensor, for example, with a range of 20 kilometres or more.

Figure 1:
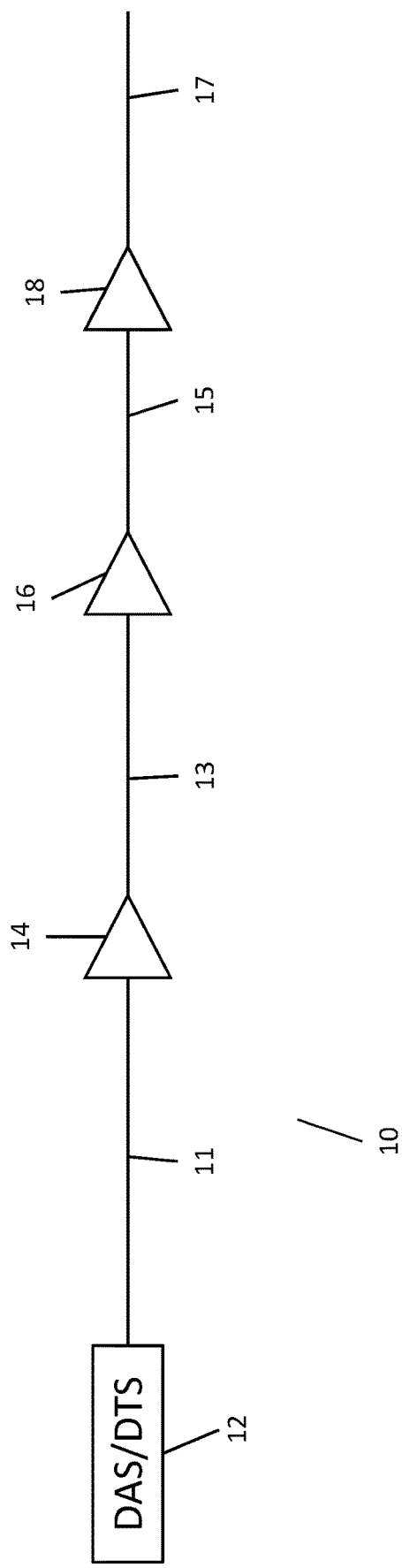
FIG. 1 is a diagram of an extended range optical fiber sensing system according to embodiments of the invention.

FIG. 1 illustrates the basic arrangement of one or more embodiments of the invention described herein. Here, an optical fiber sensor 10 comprises a sensor pulse source and backscatter and/or reflections signal processor apparatus 12, configured to act as a distributed acoustic sensor, distributed temperature sensor, OTDR, or the like. Such sensors are known in the art, such as the Silixa® iDAS™ or Ultima™ sensors, referenced previously. Extending from the sensor source and processor apparatus 12 is a length of sensing fiber 11, which constitutes a first length of sensing fiber. The first length of sensing fiber 11 is connected to the input of an amplifier module 14, which acts to amplify, and in some embodiments recondition or regenerate, the signal pulse from the sensor source apparatus 12, and send it along a second length of sensing fiber 13. Similarly, the second length of sensing fiber 13 connects to the input of a second optical amplifier module 16, which again acts to amplify and in some embodiments condition or regenerate the received pulse, before sending it into a third length of sensing fiber 15. The third length of sensing fiber 15 is received at the input of a third optical amplifier module 18, such as an optical fiber amplifier like an erbium doped fiber amplifier, which also acts to amplify and, in some embodiments, recondition or regenerate the pulse, before then transmitting the pulse into a fourth length of sensing fiber 17. In this embodiment it will therefore be seen that up to four lengths of sensing fiber are included, although it will of course be understood that fewer or more lengths of sensing fiber may be used, as required. In practice, however, the present inventors believe that good results are likely obtained up to four or five lengths of sensing fiber, although the present invention is not limited to any particular number, provided that two or more such lengths are included.

Figure 2:
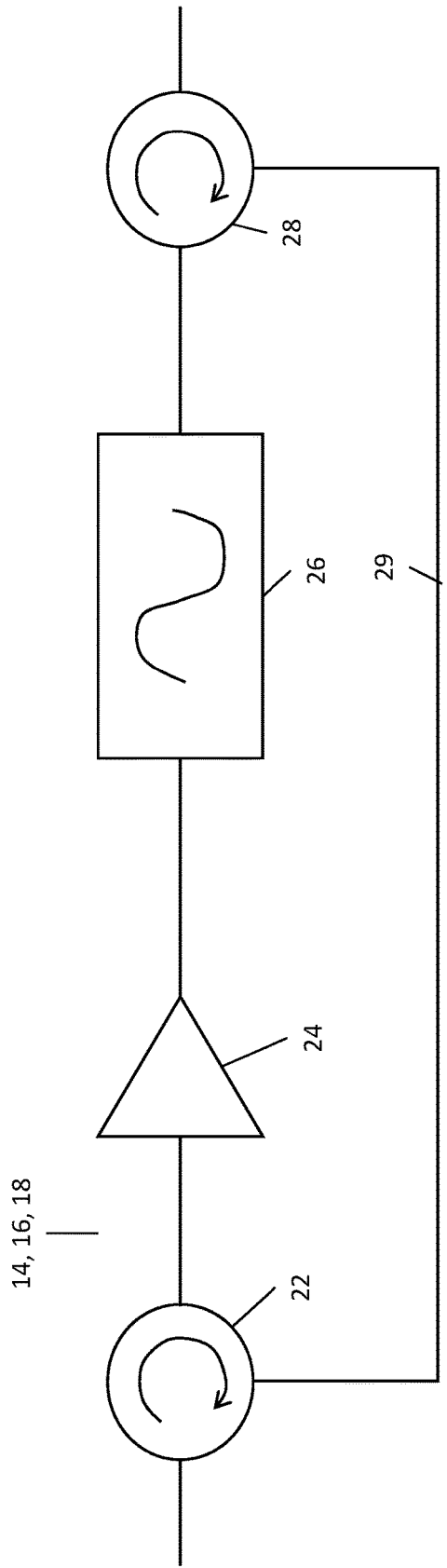
FIG. 2 is a diagram of a range extender module according to a first embodiment of the present invention.
Figure 3:
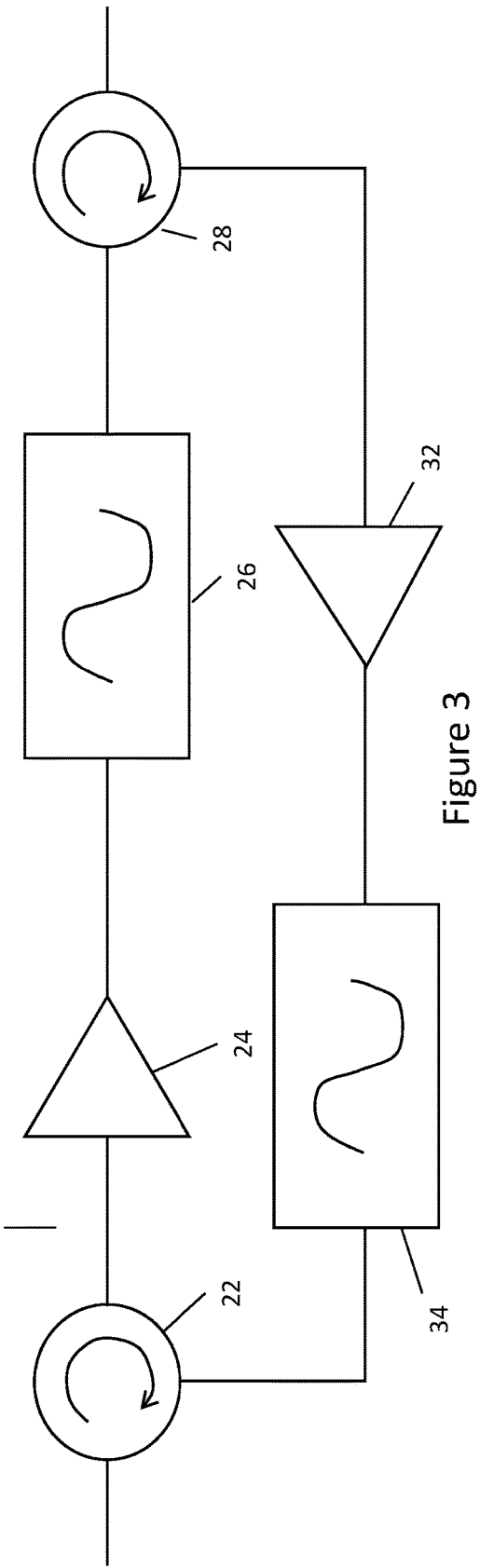
FIG. 3 is a diagram of a range extender module according to a second embodiment of the present invention.
Figure 4:
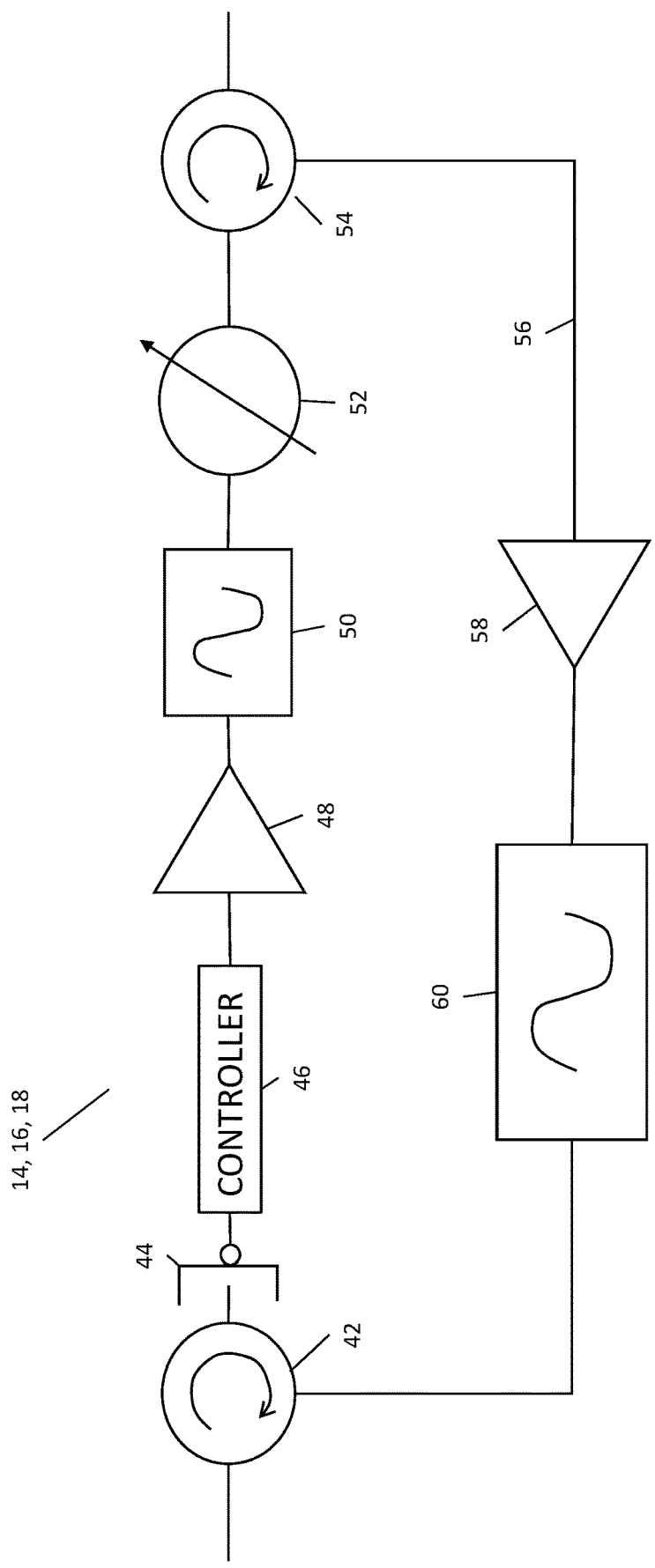
FIG. 4 is a diagram of a range extender module according to a third embodiment of the present invention.

FIGS. 2, 3, and 4 illustrate different embodiments for the amplifier modules 14, 16, and 18 of FIG. 1, and will be described further next.

FIG. 2 illustrates a first embodiment of the optical amplifier modules 14, 16, or 18. In the forward path the amplifier module 14, 16, 18 comprises a first circulator 22, which is a three port device where a signal input at a first port is output at a second port, whereas a signal input at the second port is output at the third port. Correspondingly, a signal input at the third port is output at the first port. Optical circulators are of course known in the art, and no further description of the internal operation thereof will be undertaken. The first port of the optical circulator 22 receives is connected to the optical fiber 11, 13, or 15 of the preceding fiber length, whereas the second port of the optical circulator is connected via an optical fiber to the input of an optical amplifier 24, such as an optical fiber amplifier like an erbium doped fiber 8mplifier (EDFA). The optical amplifier 24 acts to amplify the power of the incoming pulses received from the optical circulator, and then feeds them along a length of fiber via a band pass filter 26, to a first port of a second optical circulator 28. The second optical circulator 28 then outputs the amplified and filtered pulse on its second port, to be transmit along the next length of fiber 13, 15, 17, etc., as appropriate. With this forward path, therefore, signal pulses from the sensor source apparatus 12 are amplified and band pass filtered (to provide some signal reconditioning) so as to increase the power of each pulse and hence extend the range along which the pulse can propagate along the series of fibers.

With respect to backscatter and/or reflections from along the fibers, backscatter and/or reflections travelling back along the fiber along the return path is/are received at the second port of the optical circulator 28, and output on the third port thereof via fiber path 29 to the third port of the first optical circulator 22, which then routes it/them back onto the main fiber via its first port, in order to allow the backscatter and/or reflections to carry on propagating backwards towards the sensor source apparatus 12. In this way, backscatter and/or reflections from all the way along the length of the fiber is/are routed around the forward optical amplifiers and band pass filters, so that it/they can travel unimpeded (but also unamplified) back to the sensor box 12 for measurement.

FIG. 3 illustrates a further embodiment, which is a variant of the embodiment of FIG. 2. Here, the forward path is identical to the embodiment of FIG. 2, and will not therefore be described further. However the return path is also provided with an optical amplifier, such as an optical fiber amplifier like an erbium doped fiber amplifier 32, which receives the return backscatter and/or reflections signal from the third port of the optical circulator 28, and amplifies it. The amplified backscatter and/or reflections signal is then input into a band pass filter 34 where it is band pass filtered, before then being fed to the third port of the optical circulator 22, which then routes the amplified and filtered backscattered signal back onto the main optical fiber to carry on in the return direction. In this way, the backscatter and/or reflections signal can also be amplified and filtered, and hence can be ensured to be kept above the noise floor so that it can be detected by the sensor source apparatus 12.

FIG. 4 illustrates a further embodiment of an amplifier module 14, 16, or 18. Here, on the forward path a first optical circulator 42 is provided which at its first port receives an incoming pulse from an optical fiber length 11, 13, or 15. The optical circulator outputs the pulse at its second port to an electro-optic sampler 44 that samples the optical pulse and converts it back into an electrical signal, which is then fed to a controller 46. The controller 46 is then able to undertake more complicated signal processing operations on the pulse, for example such as digital filtering operations and the like, so as to recondition the pulse back into its original form. The controller 46 then outputs the reconditioned pulse electrically as a control signal to an optical fiber amplifier 48, which then recreates the optical pulse as an analogue of the reconditioned electrical pulse, the optical pulse then being band pass filtered by filter 50, before being fed to a variable attenuator 52. The variable attenuator 52 is provided to allow tuning of the power within a reconditioned pulse that is launched into the next length of fiber, in order to keep the pulse out of the power zone in which non-linear effects can occur along a length of fiber. The attenuated reconditioned pulse is output from the variable attenuator 52 to a first port of a second optical circulator 54, which then outputs the pulse back onto the next length of fiber 13, 15, or 17. In this way, the forward optical pulse can be electrically sampled, and reconditioned so as to be effectively regenerated before being launched onto the next length of fiber. By so doing, it will be seen that the range of the optical fiber sensor system can be increased almost as far as required.

With regards to the return path of backscatter, backscatter and/or reflections being received from along a length of sensing fiber 17, 15, or 13 is/are routed via the second optical circulator 54 onto its third output port and fed onto feedback path 56. Feedback path 56 includes a return path optical fiber amplifier 58, as well as a return path band pass filter 60. Amplifier 58 and filter 60 act to amplify and condition the backscatter and/or reflections so as to maintain the backscatter and/or reflections above the noise floor, so it/they can be detected. The output of band pass filter 60 feeds to the third port of the first optical circulator 42, which then routes the backscatter and/or reflections signal back onto the next length of fiber 15, 13, or 11.

One advantage of the arrangement of the third embodiment is that the forward pulse is effectively regenerated for each subsequent length of sensing fiber. Not only does this provide for improved pulse quality along any particular length of sensing fiber, but it also allows for different wave lengths of pulse to be used for the different lengths of sensing fiber. For example, therefore, a different wavelength of forward pulse could be used for sensing fiber 11 compared to sensing fiber 13, as well as for sensing fiber length 15, and for sensing fiber length 17. This helps with signal discrimination in the sensor source apparatus, as the backscatter and/or reflections from a particular length of sensing fiber will be of the same wavelength as the forward pulse on that sensing fiber. Hence, effectively, in this embodiment up to four different wavelengths of backscatter and/or reflections will propagate back down the fiber, and which can then be detected at the sensor source apparatus 12, to aid in discrimination as to from which section of sensing fiber particular backscatter and/or reflections originates.

In addition, the third embodiment also has advantages in terms of the signal conditioning that can be applied in the controller 46, in that effectively the forward signal pulse can be completely regenerated, as mentioned. This has significant advantages in maintaining the quality of the backscatter and/or reflections that is/are received, and hence the resolution of signal that can be detected. In addition, the controller 46 also allows for pulse shape conditioning, to allow the correct shape pulse to be launched from the laser 48. Again, this is one aspect of the signal pulse regeneration and conditioning that is possible with the third embodiment, which is not as easy to achieve with the first and second embodiments.

Various modifications may be made to the above embodiments to provide further embodiments. For example, in both the second and third embodiments the backscatter and/or reflections return path includes an optical amplifier 32 or 58. However, it is not necessary for each amplifier module 14, 16, and 18 to include return path amplification in this manner. Instead, in some embodiments backscatter and/or reflections amplification may be provided in only some stages or modules but not others. In particular, it is necessary when considering the system as a whole to provide just enough backscatter and/or reflections amplification to maintain the backscatter and/or reflections at detectable levels above the noise floor. However, too much backscatter and/or reflections amplification may cause distortions and reduce the resolution and fidelity of any signals to be derived from the backscatter. Therefore, reverse path amplification may be provided in one, or only a subset of the amplifier modules, rather than in each amplifier module.

In further modifications, the laser pumps required for the various erbium doped fiber amplifiers may be located away from the fiber amplifiers themselves. For example, where the extended range optical fiber sensor is being used in a downhole application, it may be possible to have another fiber run from a laser pump provided at the surface downhole parallel with the sensing fiber, in order to feed the one or more erbium doped fiber amplifiers from the surface laser pump.

Various further modifications to the above described embodiments, whether by way of addition, deletion or substitution, will be apparent to the skilled person to provide additional embodiments, any and all of which are intended to be encompassed by the appended claims.

The invention claimed is:

1. An optical fiber distributed acoustic sensor (DAS) sensing system, comprising:
   a sensing optical fiber;
   one or more optical amplifiers in series with the sensing fiber, such that each of the one or more optical amplifiers is located in series between two respective sensing fiber portions, and arranged to increase the power of sensing pulses travelling along the fiber to thereby increase the range of the sensing system; and
   optical amplifier bypass optical componentry arranged to permit optical backscatter and/or reflections from along the sensing fiber to bypass the one or more optical amplifiers.

2. The sensing system according to claim 1, wherein the bypass optical componentry includes one or more optical amplifiers arranged to amplify the optical backscatter and/or reflections so as to maintain the backscatter and/or reflections above the noise floor.

3. The sensing system according to claim 1, wherein the bypass optical componentry has backscatter and/or reflections conditioning componentry arranged to maintain or improve the spectral form of the backscatter.

4. The sensing system according to claim 3, wherein the backscatter and/or reflections conditioning componentry includes one or more bandpass filters.

5. The sensing system according to claim 1, wherein the optical amplifiers are optical fiber amplifiers.

6. The sensing system according to claim 5, wherein the optical fiber amplifiers are erbium doped fiber amplifiers.

7. The sensing system according to claim 5, wherein the optical amplifiers are optical fiber amplifiers.

8. An optical fiber distributed acoustic sensor (DAS) sensing system, comprising:
   a sensing optical fiber;
   one or more optical amplifiers in series with the sensing fiber, such that each of the one or more optical amplifiers is located in series between two respective sensing fiber portions, and arranged to increase the power of sensing pulses travelling along the fiber to thereby increase the range of the sensing system; and
   pulse conditioning componentry arranged to condition sensing pulses travelling along the fiber,
   wherein the pulse conditioning componentry includes signal regeneration componentry arranged to receive an incoming optical pulse and re-generate it with an intended optical pulse signal envelope.

9. The sensing system according to claim 8, wherein the signal regeneration componentry includes an electro-optic sampler to sample an incoming optical pulse and convert it into the electrical domain, and a signal processor arranged to receive the electrical analogue of the incoming optical pulse from the sampler and re-generate the optical pulse signal envelope, the signal processor being further arranged to control the optical amplifier to reproduce the regenerated optical pulse in accordance with the regenerated optical pulse signal envelope for onward transmission along the optical fiber.

10. The sensing system according to claim 8, wherein the optical amplifier reproduces the regenerated optical pulse at a different wavelength to the sampled incoming optical pulse.

11. The sensing system according to claim 8, wherein the optical amplifiers are fed via optical fiber from a laser pump located remotely therefrom.

12. The sensing system according to claim 8, wherein the optical amplifiers are optical fiber amplifiers.

13. The sensing system according to claim 8, wherein the optical fiber amplifiers are erbium doped fiber amplifiers.

14. An optical fiber distributed acoustic sensor (DAS) sensing system, comprising:
   a sensing optical fiber;
   one or more optical amplifiers in series with the sensing fiber, such that each of the one or more optical amplifiers is located in series between two respective sensing fiber portions, and arranged to increase the power of sensing pulses travelling along the fiber to thereby increase the range of the sensing system; and
   pulse conditioning componentry arranged to condition sensing pulses travelling along the fiber,
   wherein the pulse conditioning componentry includes a bandpass filter to maintain the spectral form of the pulses.

15. The sensing system according to claim 14, wherein the optical amplifiers are optical fiber amplifiers.

16. The sensing system according to claim 14, wherein the optical amplifiers are optical fiber amplifiers.

17. The sensing system according to claim 14, wherein the optical fiber amplifiers are erbium doped fiber amplifiers.

* * * * *